United States Patent
Ranjan et al.

(10) Patent No.: US 12,432,148 B2
(45) Date of Patent: Sep. 30, 2025

(54) TRANSPORT LAYER NETWORK RECOVERY FOR PACKET-SWITCHED COMPUTER NETWORKS

(71) Applicant: Microsoft Technology Licensing, LLC, Redmond, WA (US)

(72) Inventors: Prashant Ranjan, San Jose, CA (US); Abdulkader Kabbani, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 18/332,695

(22) Filed: Jun. 9, 2023

(65) Prior Publication Data

US 2024/0414087 A1   Dec. 12, 2024

(51) Int. Cl.
*H04L 47/125* (2022.01)
*H04L 47/26* (2022.01)
*H04L 47/62* (2022.01)

(52) U.S. Cl.
CPC ............ *H04L 47/125* (2013.01); *H04L 47/26* (2013.01); *H04L 47/62* (2013.01)

(58) Field of Classification Search
CPC ........ H04L 47/125; H04L 47/26; H04L 47/62
See application file for complete search history.

(56) References Cited

U.S. PATENT DOCUMENTS

| | | | | |
|---|---|---|---|---|
| 9,331,929 B1* | 5/2016 | Thomas | ................ | H04L 43/50 |
| 11,057,307 B1* | 7/2021 | Matthews | ............. | H04L 45/302 |
| 11,128,561 B1* | 9/2021 | Matthews | ........... | H04L 43/0882 |
| 12,149,437 B1* | 11/2024 | Matthews | ............... | H04L 45/38 |
| 2006/0221974 A1* | 10/2006 | Hilla | ...................... | H04L 45/60 370/412 |
| 2009/0219818 A1* | 9/2009 | Tsuchiya | ................. | H04L 47/10 370/236 |
| 2011/0116443 A1* | 5/2011 | Yu | ......................... | H04L 12/413 370/328 |
| 2015/0281102 A1* | 10/2015 | Lee | ....................... | H04L 47/621 370/236 |
| 2016/0154756 A1* | 6/2016 | Dodson | ............... | G06F 13/4022 710/316 |
| 2017/0279701 A1* | 9/2017 | Ahmadzadeh | ......... | H04L 43/50 |

(Continued)

*Primary Examiner* — Chris Parry
*Assistant Examiner* — Hassan Abdur-Rahman Khan
(74) *Attorney, Agent, or Firm* — Alleman Hall & Tuttle LLP

(57) ABSTRACT

A computing system for transport layer network recovery on a packet-switched computer network includes a source computing device with a processor that executes a network traffic communication module, a load balancing module, and a congestion control module. The network traffic communication module provisions a plurality of source ports to transmit outbound packets to a destination computing device, each source port being associated with a respective network path. The load balancing module assigns each outbound packet to one of the source ports using a port scheduling algorithm to uniformly distribute the packets among the source ports and associated network paths. The congestion control module detects a congestion control condition for a packet transmitted via a source port associated with a congested network path. The load balancing module assigns a next source port for a next outbound packet from a remainder of the source ports not associated with the congested network path.

19 Claims, 6 Drawing Sheets

(56) References Cited

U.S. PATENT DOCUMENTS

| | | | |
|---|---|---|---|
| 2017/0295100 A1* | 10/2017 | Hira | H04L 45/125 |
| 2019/0245915 A1* | 8/2019 | Kommula | H04L 43/0882 |
| 2020/0028786 A1* | 1/2020 | Chachmon | H04L 45/22 |
| 2021/0250245 A1* | 8/2021 | Li | H04L 41/0823 |
| 2022/0141715 A1* | 5/2022 | Mayor | H04W 24/02 |
| | | | 370/254 |
| 2022/0321478 A1* | 10/2022 | Vasudevan | H04L 47/52 |
| 2023/0125310 A1* | 4/2023 | Zhang | G06N 20/00 |
| | | | 726/22 |
| 2023/0188561 A1* | 6/2023 | Finkelshtien | H04L 63/1441 |
| | | | 726/22 |
| 2023/0198914 A1* | 6/2023 | Ranjan | G06N 3/098 |
| | | | 370/392 |
| 2023/0231785 A1* | 7/2023 | Kumar | H04L 41/069 |
| | | | 709/224 |
| 2023/0403233 A1* | 12/2023 | Rahman | H04L 49/9047 |
| 2024/0243992 A1* | 7/2024 | Lokhandwala | H04L 45/566 |
| 2024/0323124 A1* | 9/2024 | Kabbani | H04L 47/125 |

\* cited by examiner

TRANSPORT LAYER NETWORK RECOVERY FOR PACKET-SWITCHED COMPUTER NETWORKS

BACKGROUND

It is desirable for packet-switched computer networks to operate with high efficiency and reliability, even when experiencing a high volume of packets. Under certain operating conditions, if too many packets are sent along a particular network path, network congestion can develop, resulting in slower response times or dropped packets. While certain techniques have been developed for addressing such congestion, those techniques can themselves cause transient congestion and underutilization of network resources. As a result, opportunities exist for improving the efficiency and reliability of computer networks.

SUMMARY

In view of these issues, computing systems and methods for transport layer network recovery on a packet-switched computer network are provided. In one aspect, the computing system includes a source computing device with a processor that executes instructions using portions of associated memory to implement a network traffic communication module, a load balancing module, and a congestion control module. The network traffic communication module is configured to establish a transport layer connection with a destination computing device, identify a set of network paths to the destination computing device, and provision a plurality of source ports to transmit outbound packets over the transport layer connection to the destination computing device. Each source port of the plurality of source ports is associated with a respective network path of the set of network paths. The load balancing module assigns each outbound packet on a per-packet basis to one of the plurality of source ports using a port scheduling algorithm that varies a value of a respective field in a respective header of each outbound packet to uniformly distribute the packets among the plurality of source ports and associated network paths. The congestion control module detects a congestion control condition for a sent packet transmitted via a source port associated with a congested network path. The load balancing module assigns a next source port for a next outbound packet based on the detected congestion control condition of the sent packet. The assignment of the next source port is made from among a remainder of the plurality of source ports not associated with the congested network path.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
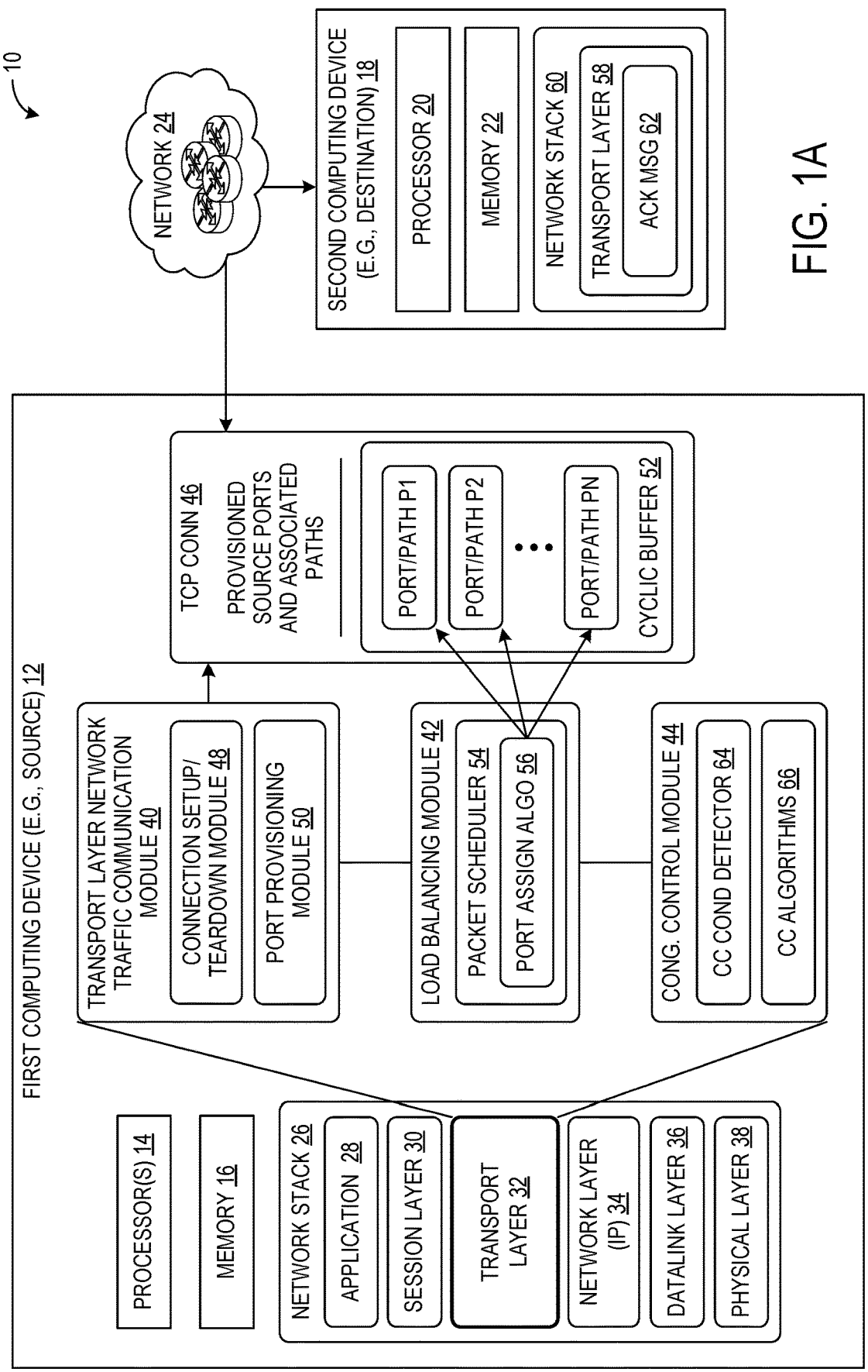
FIG. 1A shows a schematic view of a computing system for transport layer network recovery on a packet-switched computer network, according to one embodiment of the present disclosure.

Transmission control protocol (TCP) is a widely used connection-based transport layer protocol for networked computing systems, including those that handle high volumes of network traffic. High volumes of network traffic can put a computing network at risk of congestion. For example, when a source computing device transmits outbound packets at a data rate faster than the bandwidth of a link, the packets are placed in a buffer until they can be sent, thereby increasing the round trip time of each packet. If the source computing device continues to transmit data faster than the packets can leave the buffer, the buffer will fill until there is no room for more packets, and new packets will be dropped upon arrival. Acknowledgements (ACK) for packets transmitted along a congested network path may include congestion indicators, such as an explicit congestion notification, or may be used to compute a round trip time (RTT). A threshold tolerance value for measured RTTs can be established above which congestion is deemed to have occurred. An ACK packet is sent by the destination computing device to the source computing device according to the TCP protocol to confirm safe receipt of the packet from the source computing device. Accordingly, the lack of an ACK after a threshold period of time following transmission of a message from the source computing device can signal that a packet was dropped, which is an indicator of network congestion.

While congestion controllers and load balancers may limit data and re-route network traffic as network recovery measures to reduce congestion, these network recovery measures can drastically slow data rates, such as when protocols such as TCP slow start are used. Additionally, these solutions are typically implemented at the software level, within the TCP/IP stack in the source computing device, which may require manual intervention and tuning by a software developer to strike a proper balance and avoid overly slowing data rates.

Another approach for preventing congestion is to deploy specialized switches in the computer network that direct network traffic in an adaptive manner to an outbound port with the shortest packet queue. However, this solution can also be cost-prohibitive due to the specialized switch hardware it entails. The costs can mount in large-scale backend computer networks, such as artificial intelligence supercomputers.

Further, even if the congestion and load balancing techniques above are adopted, and the specialized switches with adaptive shortest queue load balancing are deployed throughout a network, there still exists the problem of transitory imbalances in network traffic caused as these congestion counter measures are implemented. If two different switches each detect congestion and re-route traffic to the same network path using the switch-based adaptive load balancing, for example, intermittent congestion will temporarily result until the situation abates. Such intermittent network congestion in the aggregate network can result in wasted power consumption, underutilized hardware, slower RTTs, lower aggregate utilized bandwidth, and higher operating costs for the operator of the computing system. As such, there exists a need for a reliable, efficient, cost-effective recovery mechanism that allows high-volume network connections to recover from dropped packets, link failures, switch failures, and the like without the need for software or manual intervention.

As schematically illustrated in FIG. 1A, to address the above identified issues, a computing system 10 for transport layer network recovery on a packet-switched computer network is provided. The computing system 10 is illustrated as comprising a first computing device 12 including one or more processors 14 and memory 16, and a second computing device 18 including one or more processors 20 and memory 22, with the first and second computing devices 12, 18 being in communication with one another via a network 24 including one or more routers or switches. The illustrated implementation is exemplary in nature, and other configurations are possible. In the description of FIG. 1A below, the first computing device will be described as a source computing device 12 and the second computing device will be described as a destination computing device 18, and respective functions carried out at each device will be described. It will be appreciated that in other configurations, the first computing device could be implemented as a server computing or an intermediate networking device such as a router, gateway, load balancer, firewall, etc. In some alternative configurations, functions described as being carried out at the destination computing device 18 may alternatively be carried out at the source computing device 12 and vice versa.

Continuing with FIG. 1A, the server computing device 12 further includes a network stack 26 to manage communications with other devices, including the destination computing device 18. The network stack 26 includes an application layer 28, a session layer 30, a transport layer 32, a network (IP) layer 34, a datalink layer 36, and a physical layer 38. It will be appreciated that the transport layer 32 may be implemented as a TCP/IP layer, an MPTCP layer, or any other suitable transmission protocol. The network stack may be implemented in software, firmware, or hardware, as desired.

As discussed above, the source computing device 12 includes one or more processors 12 and associated memory 14. The one or more processors 12 are configured to execute instructions using portions of the associated memory 14 to implement a network traffic communication module 40, a load balancing module 42, and a congestion control module 44, each of which is included in the transport layer 32, as indicated in FIG. 1A.

The network traffic communication module 40 establishes a transport layer connection 46 with the destination computing device 18. To this end, the network traffic communication module 40 is configured to execute a connection setup/teardown module 48 to connect and disconnect communication with the destination computing device 18. The connection setup/teardown module 48 identifies a set of network paths to the destination computing device 18, and a plurality of source ports are provisioned by a port provisioning module 50 included in the network traffic communication module 40. Each source port of the plurality of source ports is configured to transmit outbound packets over the transport layer connection 48 to the destination computing device 18 via a respective network path of the identified set of network paths, e.g. port/path P1, port/path P2 . . . port/path PN.

As described in detail with reference to FIG. 2, the plurality of source ports are stored in a cyclic buffer 52, and the load balancing module 42 is configured to assign each outbound packet on a per-packet basis to one of the plurality of source ports in the cyclic buffer 52 via a packet schedular 54. The cyclic buffer is typically implemented in hardware such as a memory buffer of a dedicated microprocessor on a network interface of the source computing device 12, but may also be implemented in software or firmware using portions of memory 16 if desired. Hardware and firmware implementations carry attendant processing speed advantages, while software implementations offer flexibility for modification. The packet scheduler 54 includes a port assignment algorithm 56 that varies a value of a respective field in a respective header of each outbound packet to point to a source port in the cyclic buffer 52 such that the packets are uniformly distributed among the plurality of source ports and associated network paths. As described in detail with reference to FIG. 2, a predetermined number of source ports are recorded in the cyclic buffer 52, and each source port in the cyclic buffer 52 is associated with a known good network path, i.e., a network path that is not broken or experiencing congestion.

Outbound packets transmitted from the source computing device 12 are received via a transport layer 58 in a network stack of the destination computing device 18. The transport layer 58 generates and sends an acknowledgement (ACK) 62 to the source computing device 12. The ACK 62 indicates when the outbound packet was received at the destination computing device 18, as well as a source port identifier, network path congestion information, and router and/or switch identifiers for the network path along which the outbound packet was sent.

The source computing device 12 receives the ACK 62 and determines a RTT for the transmission of the packet and return of the ACK based on when the outbound packet was transmitted from the source computing device 12 to the destination computing device 18 and when the ACK 62 was received at the source computing device 12. A congestion control detector 64 included in the congestion control module 44 is configured to detect a congestion control condition for a sent packet when the packet is transmitted via a source port associated with a congested network path. The congestion control condition may be indicated by the congestion information in the ACK 62, which may be an explicit congestion notification (ECN) received from a downstream networking device, including switches or routers along the network path or the second computing device 18. Additionally or alternatively, the congestion control condition may be a value indicating a dropped packet or RTT for the packet and ACK that exceeds a threshold tolerance value for the RTT. It will be appreciated that a packet that has timed out is considered to have an RTT that exceeds the threshold tolerance value for the RTT. The congestion control module 44 may also include congestion control algorithms 66, which may be implemented to indicate a dropped packet that needs to be retransmitted, as well as a priority level, size, or transportation protocol for each packet.

When a congestion control condition is detected by the congestion control detector 64, the load balancing module 42 assigns a next source port for a next outbound packet. The next outbound packet may be a dropped packet that needs to be transmitted or a packet that is next in a packet queue of packets to be sent. The next source port is assigned from among a remainder of the plurality of source ports not associated with the congested network path by changing the value of the respective field in the respective header of the next outbound packet to point to a source port not associated with the congested network path, i.e., a known good network path. As discussed above and described in detail below with reference to FIG. 2, a predetermined number of known good network paths are recorded in the cyclic buffer 52.

The next source port may be assigned according to a random assignment, a next round robin assignment, or based on a probe query sent to a downstream networking device. The probe query can provide details regarding the congestion state (e.g., RTT) of a network path to the downstream networking device over a particular source port on the source computing device. When the next source port is assigned according to a random assignment, the value of the field in the header is changed to a value that points to a random source port in the cyclic buffer 52. When the next source port is assigned according to a next round robin assignment, the value of the field in the header is changed to a value that points to the source port that has been in the cyclic buffer 52 for the longest period of time, i.e., the source port that is at the top of an ordered list of source ports. When the next source port is assigned based on a probe query sent to a downstream networking device, the value of the field in the header is changed to a value that points to the source port in the cyclic buffer 52 that is associated with the most efficient network path, such as the network path with the lowest RTT for the probe query.

In some implementations, the next source port is a first next source port, and the load balancing module 42 is prevented from assigning a second next source port for a predetermined period of time after assigning the first next source port. This prevents a use-case scenario in which multiple variables complicate the assignment of source ports such that congestion conditions are relieved. Further, it avoids oscillation back and forth in congestion among ports and paths due to quick changes back and forth. In a situation in which the congestion control information of two or more outbound packets sent from two or more ports of the plurality of ports via two or more respective associated network paths meets the congestion control condition, a network path of the two or more respective associated network paths having a highest congestion value is determined to be the congested network path.

Figure 1B:
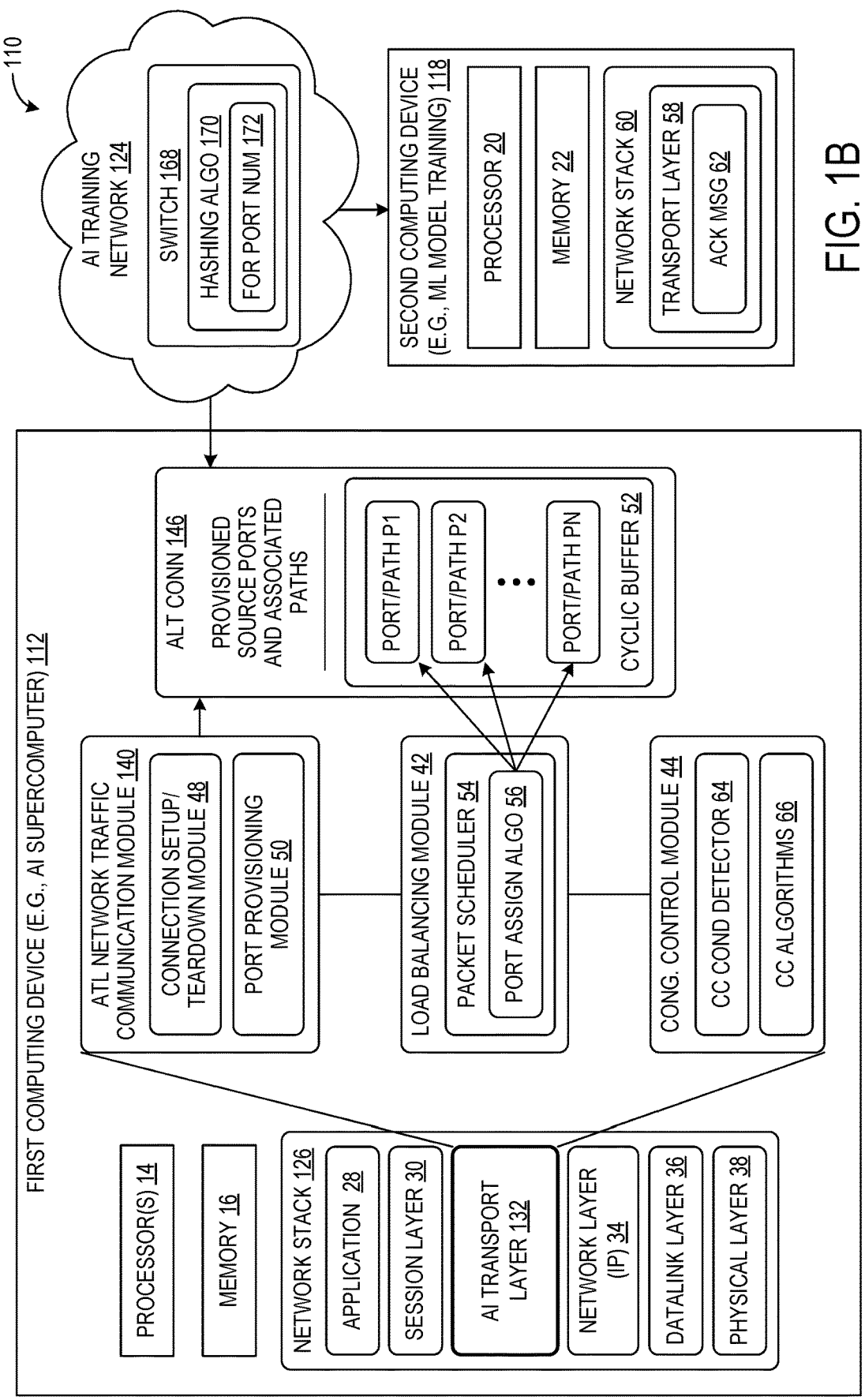
FIG. 1B shows a schematic view of a computing system for transport layer network recovery on a packet-switched artificial intelligence computer network, according to a second embodiment of the present disclosure.

Turning to FIG. 1B, a schematic view of a computing system 110 for transport layer network recovery on a packet-switched artificial intelligence training computer network is shown. The computing system 110 is directed to transport layer network recovery on a packet-switched artificial intelligence (AI) training network 124 that is used for training large machine learning (ML) models and has substantially the same configuration as the computing system 10, with the exception that each network path is randomly selected and includes at least one switch 168. In practice, many switches are included and the network is several layers deep.

In the embodiment illustrated in FIG. 1B, the first computing device is a source computing device implemented as an AI supercomputer 112. The second computing device is a destination computing device that is implemented as a ML model training device 118. The network stack 126 of the AI supercomputer 112 includes an AI transport layer 132 (ATL). The ATL network traffic communication module is configured to establish an ATL connection via an ATL protocol with the ML training device 118 and identify a set of network paths to the ML training device 118. The ATL protocol uses a random entropy, the source port identifier, in each packet to select a random network path. As described above and shown in FIG. 1B, each network path includes at least one switch 168. The at least one switch 168 is configured to execute a hashing algorithm 170 that uses a source port identifier, i.e., the value in the respective field of the respective header, of an incoming packet transmitted from the source computing device 112 to generate a hash-based forwarding port number 172 for the incoming packet. The hash-based forwarding port number 172 works to spray packets randomly across network paths, thereby ensuring effective load balancing across all paths of the AI training computer network.

The remaining elements of FIG. 1B have substantially the same function as those described above with reference to the computing system 10 illustrated in FIG. 1A, and are not described again for the sake of brevity.

Figure 2:
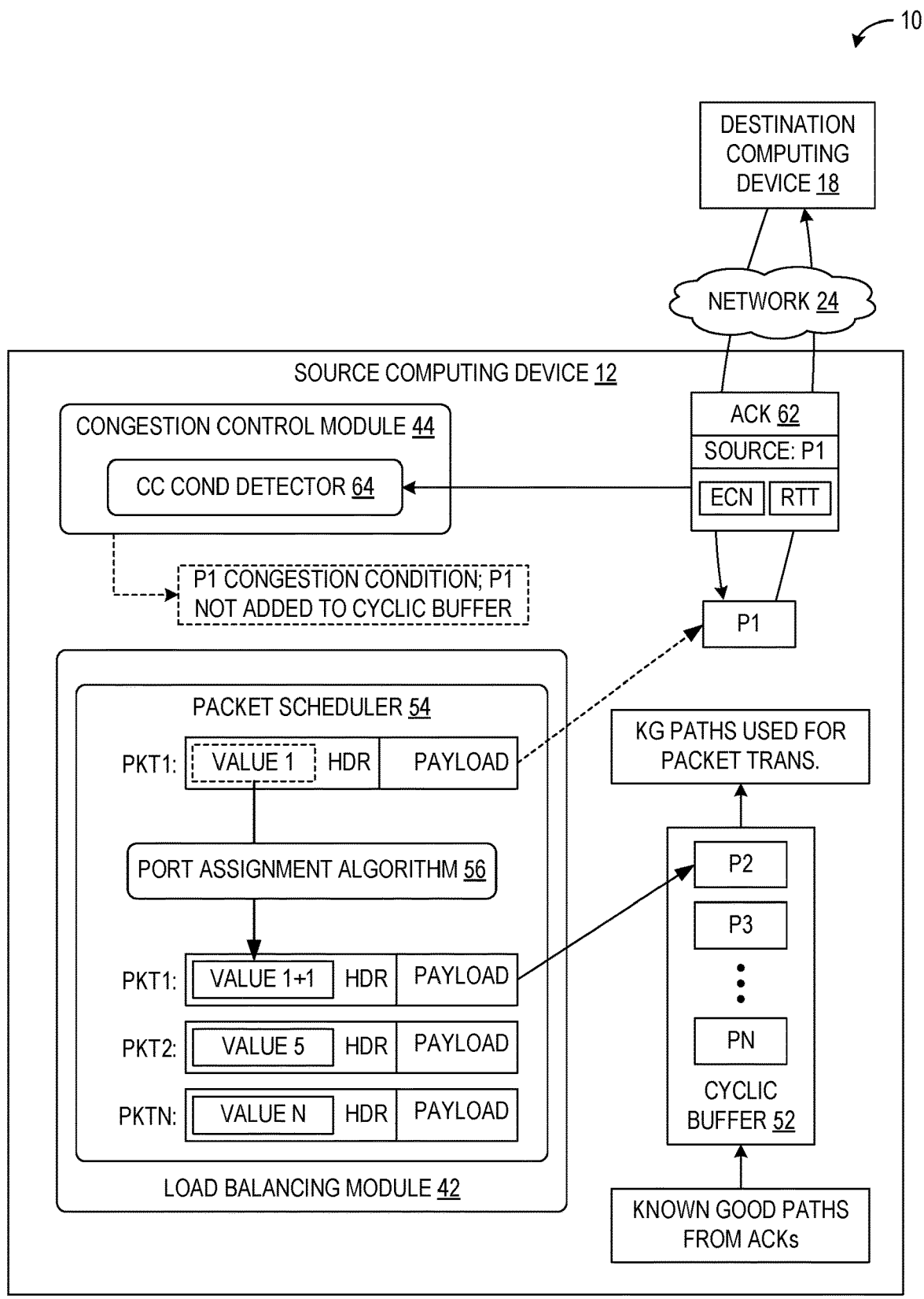
FIG. 2 shows a schematic view of a next source port assignment by a packet scheduler of the computing system of FIG. 1A.

FIG. 2 shows a schematic view of an example of a next source port assignment by the packet scheduler 54. While FIG. 2 is described in accordance with the computing system 10 of FIG. 1A, it will be appreciated that the packet scheduler 54 may also be implemented with the computing system 110 of FIG. 1B.

In the example shown in FIG. 2, a next outbound packet PKT1 in the packet scheduler 54 has a value 1 in the field in the header that indicates that the PKT1 is scheduled to be sent via a source port P1 and an associated network path, as indicated by the dashed lines. However, the congestion control condition detector 64 detects a congestion control condition in the ACK 62 for a transmitted packet sent via the source port P1 and the associated network path, as indicated by an ECN and/or an RTT that exceeds a threshold tolerance value for the RTT. As such, the source port P1 is not associated with a known good network path and is thus not added to the cyclic buffer 52.

The packet scheduler 54 executes the port assignment algorithm 56 to assign a next source port for the next outbound packet PKT 1. In the illustrated example, the next source port is assigned according to a next round robin assignment, and the value of the field in the header of the next outbound packet PCK1 is changed to a value 1+1 that points to the next source port P2. As such, dropped packets and network failures can be recovered at the transport layer of the network communication protocol by assigning source ports associated with known good network paths to transmit outbound packets, thereby alleviating the need for software or manual intervention.

Figure 3:
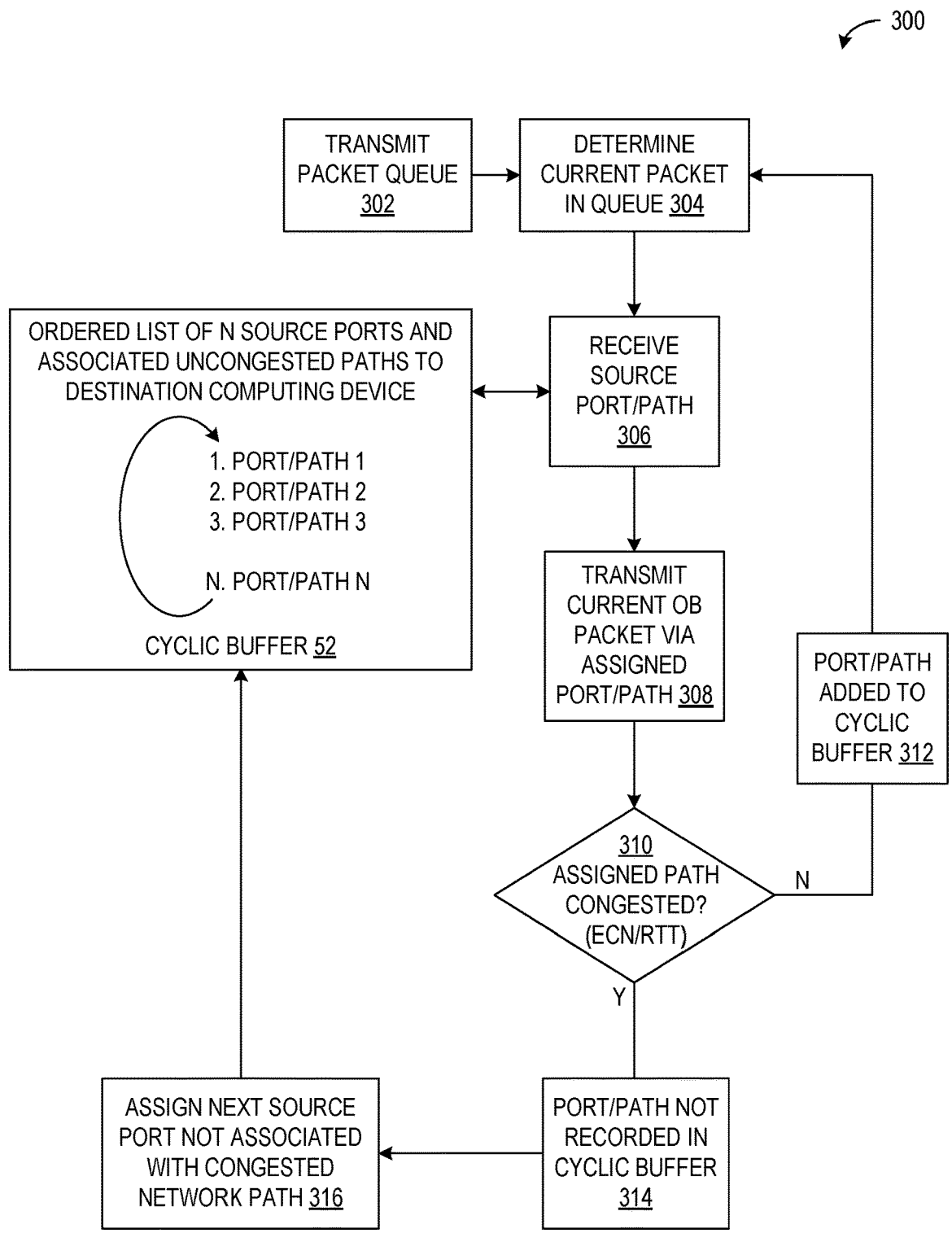
FIG. 3 shows a flow diagram of a method for determining a network path for transmitting a packet, which may be implemented by the computing system of FIG. 1A, FIG. 1B, or other suitable hardware and software.

FIG. 3 shows a flow diagram of a method for determining a network path for transmitting a packet. At step 302 the method may include transmitting the packet queue to the transport layer. Proceeding from step 302 to step 304, the method 300 may further include determining a current packet in the packet queue as the next outbound packet to be transmitted. Advancing from step 304 to step 306, the method 300 may further include receiving a source port/path assignment. As described in detail above, an ordered list of source ports and associated uncongested, i.e., known good, paths to the destination computing device are stored in the cyclic buffer 52, and the load balancing module 42 assigns a next source port for a next outbound packet. Continuing from step 306 to step 308, the method 300 may further include transmitting the current outbound packet to the destination computing device via the assigned port and associated path.

At step 310, the source computing device may query whether the assigned network path is congested, as indicated by an ECN in the ACK, or a value indicating a dropped packet or an RTT for the current outbound packet that exceeds a threshold tolerance value for the RTT. If NO, the method 300 proceeds to step 312, the assigned source port and associated network path are added to the cyclic buffer as a known good path, and the method 300 returns to step 304. As described above, a predetermined number of source ports and respective associated network paths are recorded in the cyclic buffer. It will be appreciated that adding a new source port and associated path to this fixed length circular buffer typically involves inserting the new source port and associated path as the first (most recent) entry in the buffer, dropping the oldest entry from the last position in the buffer, and the other source ports and respective associated paths are incremented in their positions. Of course, the buffer entry positions may be handled by updating the pointers to each memory location of the buffer entries, rather than moving the buffer entries within memory.

If YES, the method 300 proceeds to step 314, and the port and its associated congested network path are not recorded in the cyclic buffer. At step 316, the method 300 may include assigning the next source port that is not associated with a congested network path. As described in detail above, the next source port may be assigned according to a random assignment, a next round robin assignment, or based on a probe query sent to a downstream networking device.

Figure 4:
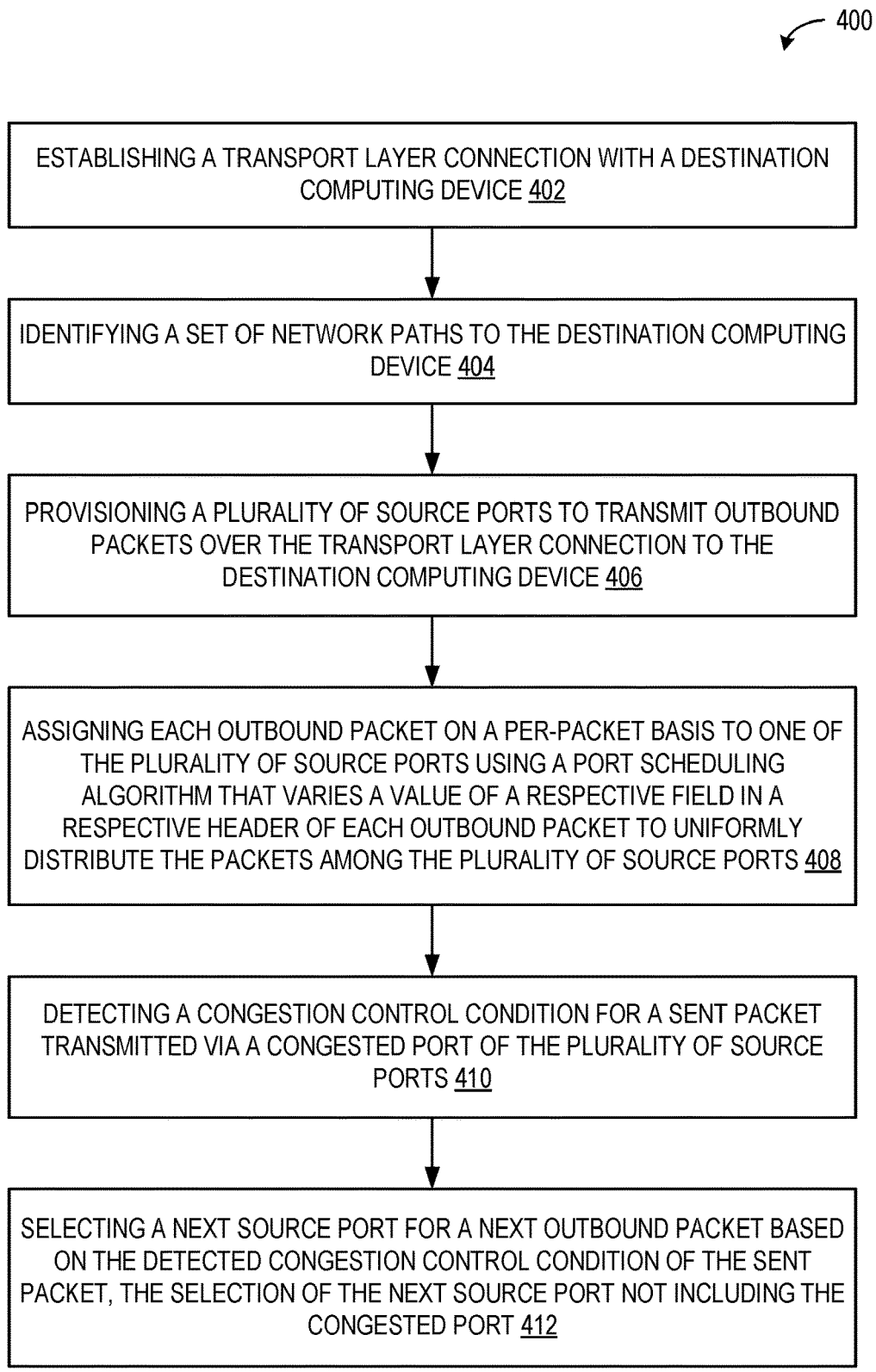
FIG. 4 shows a flow diagram of a method for transport layer network recovery on a packet-switched computer network, which may be implemented by the computing system of FIG. 1A, FIG. 1B, or other suitable hardware and software.

FIG. 4 shows a flow diagram for a method 400 for transport layer network recovery on a packet-switched computer network. Method 400 may be implemented by the hardware and software of computing system 10 described above, or by other suitable hardware and software. At step 402, the method 400 may include establishing a transport layer connection with a destination computing device. Proceeding from step 402 to step 404, the method 400 may further include identifying a set of network paths to the destination computing device. Advancing from step 404 to step 406, the method 400 may further include provisioning a plurality of source ports to transmit outbound packets over the transport layer connection to the destination computing device, each source port of the plurality of source ports being associated with a respective network path of the set of network paths.

Continuing from step 406 to step 408, the method 400 may further include assigning each outbound packet on a per-packet basis to one of the plurality of source ports using a port scheduling algorithm that varies a value of a respective field in a respective header of each outbound packet to uniformly distribute the packets among the plurality of source ports and associated network paths.

Proceeding from step 408 to step 410, the method 400 may further include detecting a congestion control condition for a sent packet transmitted via a source port associated with a congested network path. As discussed in detail above, the congestion control condition may be an explicit congestion notification received from a downstream networking device. Additionally or alternatively, the congestion control condition may be a value indicating a dropped packet or round trip time for the packet that exceeds a threshold tolerance value for the round trip time.

Advancing from step 410 to step 412, the method 400 may further include assigning a next source port for a next outbound packet from among a remainder of the plurality of source ports not associated with the congested network path. As discussed in detail above, assigning the next source port may be performed according to a random assignment, according to a next round robin assignment, based on a probe query sent to a downstream networking device, and/or by changing the value of the respective field of the respective header of the next outbound packet. When the next source port is a first source port, the method may further comprise preventing assignment of a second next source port for a predetermined period of time after assigning the first next source port. When congestion control information of two or more outbound packets sent from two or more ports of the plurality of ports meets the congestion control condition, the method may further comprise determining a port of the two or more ports having a highest congestion value to be the congested port.

The systems and methods described herein enable network path recovery at the transport layer level controlled by a source computing device, which allows a network connection to recover from dropped packets, link failures, switch failures, and the like in a predictable manner that uniformly utilizes available, uncongested network paths to the destination computing device. As the recovery mechanism is implemented at the transport layer of the network communications protocol, it can be implemented over underlying layer 2 and layer 3 networks, as well as with backend and front end networks, and large-scale networks. Identifying source ports associated with known good paths by which to send outbound packets improves the reliability and availability of the network, thereby reducing operation and ownership expenses, as no specialized switch hardware, such as those that implement adaptive packet spray, is utilized. Further, because the source ports associated with known good network paths are recorded in a cyclic buffer in hardware, the network can recover from failure more efficiently by uniformly using the available uncongested network paths, than conventional recovery mechanisms.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
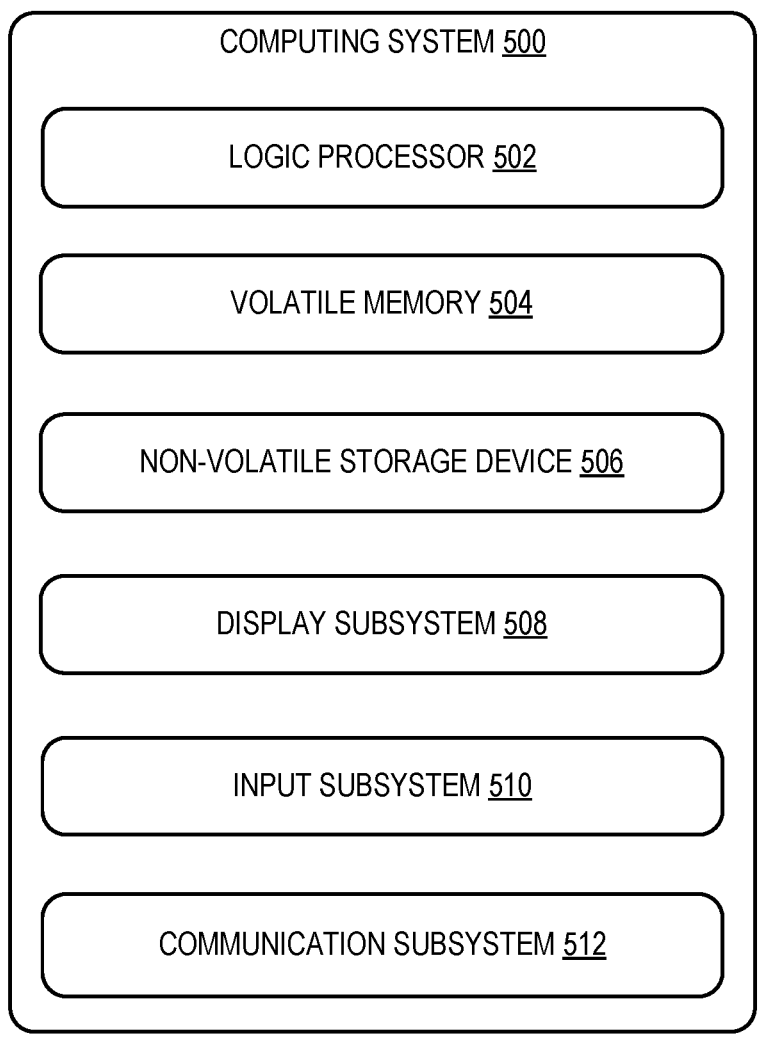
FIG. 5 shows a schematic view of an example computing environment in which the computing system of FIG. 1A, FIG. 1B, may be enacted.

FIG. 5 schematically shows a non-limiting embodiment of a computing system 500 that can enact one or more of the methods and processes described above. Computing system 500 is shown in simplified form. Computing system 500 may embody the computer system 10 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, camera, or microphone. In some embodiments, the input subsystem may comprise or interface with selected natural user input (NUI) componentry.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

The following paragraphs provide additional description of aspects of the present disclosure. One aspect provides a computing system for transport layer network recovery on a packet-switched computer network. The computing system may comprise a source computing device. The source computing device may comprise a processor that executes instructions using portions of associated memory to implement a network traffic communication module, a load balancing module, and a congestion control module. The network traffic control module may be configured to establish a transport layer connection with a destination computing device, identify a set of network paths to the destination computing device, and provision a plurality of source ports to transmit outbound packets over the transport layer connection to the destination computing device. Each source port of the plurality of source ports may be associated with a respective network path of the set of network paths. The load balancing module may assign each outbound packet on a per-packet basis to one of the plurality of source ports using a port scheduling algorithm that varies a value of a respective field in a respective header of each outbound packet to uniformly distribute the packets among the plurality of source ports and associated network paths. The congestion control module may detect a congestion control condition for a sent packet transmitted via a source port associated with a congested network path. The load balancing module may assign a next source port for a next outbound packet from among a remainder of the plurality of source ports not associated with the congested network path.

In this aspect, additionally or alternatively, the next source port may be assigned according to a random assignment.

In this aspect, additionally or alternatively, the next source port may be assigned according to a next round robin assignment.

In this aspect, additionally or alternatively, the next source port may be assigned based on a probe query sent to a downstream networking device.

In this aspect, additionally or alternatively, the next source port may be assigned by changing the value of the respective field of the respective header of the next outbound packet.

In this aspect, additionally or alternatively, the congestion control condition may be an explicit congestion notification received from a downstream networking device.

In this aspect, additionally or alternatively, the congestion control condition may be a value indicating a dropped packet or round trip time for the packet that exceeds a threshold tolerance value for the round trip time.

In this aspect, additionally or alternatively, the next source port may be a first next source port, and the load balancing module may be prevented from assigning a second next source port for a predetermined period of time after assigning the first next source port.

In this aspect, additionally or alternatively, when congestion control information of two or more outbound packets sent from two or more ports of the plurality of ports via two or more respective associated network paths meets the congestion control condition, a network path of the two or more respective associated network paths having a highest congestion value may be determined to be the congested network path.

In this aspect, additionally or alternatively, the remainder of the plurality of source ports not associated with the congested network path may be recorded in a cyclic buffer.

Another aspect provides a method for transport layer network recovery on a packet-switched computer network. The method may comprise, at a source computing device, establishing a transport layer connection with a destination computing device, identifying a set of network paths to the destination computing device, provisioning a plurality of source ports to transmit outbound packets over the transport layer connection to the destination computing device, each source port of the plurality of source ports being associated with a respective network path of the set of network paths, assigning each outbound packet on a per-packet basis to one of the plurality of source ports using a port scheduling algorithm that varies a value of a respective field in a respective header of each outbound packet to uniformly distribute the packets among the plurality of source ports and associated network paths, detecting a congestion control condition for a sent packet transmitted via a source port associated with a congested network path, and assigning a next source port for a next outbound packet from among a remainder of the plurality of source ports not associated with the congested network path.

In this aspect, additionally or alternatively, the method may further comprise assigning the next source port according to a random assignment.

In this aspect, additionally or alternatively, the method may further comprise assigning the next source port according to a next round robin assignment.

In this aspect, additionally or alternatively, the method may further comprise assigning the next source port based on a probe query sent to a downstream networking device.

In this aspect, additionally or alternatively, the method may further comprise assigning the next source port by changing the value of the respective field of the respective header of the next outbound packet.

In this aspect, additionally or alternatively, the congestion control condition may be an explicit congestion notification received from a downstream networking device.

In this aspect, additionally or alternatively, the congestion control condition may be a value indicating a dropped packet or round trip time for the packet that exceeds a threshold tolerance value for the round trip time.

In this aspect, additionally or alternatively, the next source port may be a first next source port, and the method may further comprise preventing assignment of a second next source port for a predetermined period of time after assigning the first next source port.

In this aspect, additionally or alternatively, congestion control information of two or more outbound packets sent from two or more ports of the plurality of ports may meet the congestion control condition, and the method may further comprise determining a port of the two or more ports having a highest congestion value to be the congested port.

Another aspect provides a computing system for use with packet-switched artificial intelligence training computer network. The computing system may comprise a source computing device comprising a processor that executes instructions using portions of associated memory to implement a network traffic communication module and a load balancing module. The network traffic communication module may be configured to establish an artificial intelligence transport layer connection via an artificial intelligence transport layer protocol with a destination computing device, identify a set of network paths to the destination computing device, each network path of the set of the network paths including at least one switch, and provision a plurality of source ports to transmit outbound packets over the artificial intelligence transport layer connection to the destination computing device, each source port of the plurality of source ports being associated with a respective network path of the set of network paths. The load balancing module that may assign each outbound packet on a per-packet basis to one of the plurality of source ports using a port scheduling algorithm that uniformly distributes the packets among the plurality of source ports, a field in a respective header of each outbound packing including a respective source port identifier. The at least one switch may execute a hashing algorithm that uses the source port identifier of an incoming packet transmitted from the source computing device to generate a hash-based forwarding port number for the incoming packet. Upon receipt of the incoming packet, the destination computing device may generate an acknowledgment notification including the source port identifier and congestion information for the associated network path along which the packet was transmitted, and may send the acknowledgment notification to the source computing device. When the associated network path is congested, the load balancing module may assign a next source port from a remainder of the plurality of source ports not associated with the congested network path to ensure that outbound packets requiring retransmission are transmitted via an uncongested network path.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for transport layer network recovery on a packet-switched computer network, the computing system comprising:
 a source computing device comprising a processor that executes instructions using portions of associated memory to implement:
  a network traffic communication module configured to:
   establish a transport layer connection with a destination computing device,
   identify a set of network paths to the destination computing device, and
   provision a plurality of source ports to transmit outbound packets over the transport layer connection to the destination computing device, each source port of the plurality of source ports being associated with a respective network path of the set of network paths;
  a load balancing module that assigns each outbound packet on a per-packet basis to one of the plurality of source ports using a port scheduling algorithm that varies a value of a respective field in a respective header of each outbound packet to uniformly distribute the packets among the plurality of source ports and associated network paths; and
  a congestion control module that detects a congestion control condition for a sent packet transmitted via a source port associated with a congested network path, wherein
 the plurality of source ports are stored in a cyclic buffer,
 the congestion control condition is indicated by congestion information in an acknowledgement message for the sent packet,
 when the congestion control module detects the congestion control condition, the source port associated with the congested network path is not added to the cyclic buffer, such that each source port of the plurality of source ports stored in the cyclic buffer is associated with a respective known good network path at the time of its respective addition to the cyclic buffer, and
 the load balancing module assigns a next source port for a next outbound packet from among a remainder of the plurality of source ports stored in the cyclic buffer and not associated with the congested network path.

2. The computing system of claim 1, wherein
the next source port is assigned according to a random assignment.

3. The computing system of claim 1, wherein
the next source port is assigned according to a next round robin assignment.

4. The computing system of claim 1, wherein
the next source port is assigned based on a probe query sent to a downstream networking device.

5. The computing system of claim 1, wherein
the next source port is assigned by changing the value of the respective field of the respective header of the next outbound packet.

6. The computing system of claim 1, wherein
the congestion control condition is an explicit congestion notification received from a downstream networking device.

7. The computing system of claim 1, wherein
the congestion control condition is a value indicating a dropped packet or round trip time for the packet that exceeds a threshold tolerance value for the round trip time.

8. The computing system of claim 1, wherein
the next source port is a first next source port, and
the load balancing module is prevented from assigning a second next source port for a predetermined period of time after assigning the first next source port.

9. The computing system of claim 1, wherein
when congestion control information of two or more outbound packets sent from two or more ports of the plurality of ports via two or more respective associated network paths meets the congestion control condition, a network path of the two or more respective associated network paths having a highest congestion value is determined to be the congested network path.

10. A method for transport layer network recovery on a packet-switched computer network, the method comprising, at a source computing device:
 establishing a transport layer connection with a destination computing device;
 identifying a set of network paths to the destination computing device;
 provisioning a plurality of source ports to transmit outbound packets over the transport layer connection to the destination computing device, each source port of the plurality of source ports being associated with a respective network path of the set of network paths;
 storing the plurality of source ports in a cyclic buffer;
 assigning each outbound packet on a per-packet basis to one of the plurality of source ports using a port scheduling algorithm that varies a value of a respective field in a respective header of each outbound packet to uniformly distribute the packets among the plurality of source ports and associated network paths;
 detecting a congestion control condition for a sent packet transmitted via a source port associated with a congested network path, the congestion control condition being indicated by congestion information in an acknowledgement message for the sent packet;
 refraining from adding the source port associated with the congested network to the cyclic buffer, such that each source port of the plurality of source ports stored in the cyclic buffer is associated with a respective known good network path at the time of its respective addition to the cyclic buffer; and
 assigning a next source port for a next outbound packet from among a remainder of the plurality of source ports stored in the cyclic buffer and not associated with the congested network path.

11. The method of claim 10, the method further comprising:
 assigning the next source port according to a random assignment.

12. The method of claim 10, the method further comprising:
 assigning the next source port according to a next round robin assignment.

13. The method of claim 10, the method further comprising:
 assigning the next source port based on a probe query sent to a downstream networking device.

14. The method of claim 10, the method further comprising:
assigning the next source port by changing the value of the respective field of the respective header of the next outbound packet.

15. The method of claim 10, wherein
the congestion control condition is an explicit congestion notification received from a downstream networking device.

16. The method of claim 10, wherein
the congestion control condition is a value indicating a dropped packet or round trip time for the packet that exceeds a threshold tolerance value for the round trip time.

17. The method of claim 10, wherein
the next source port is a first next source port, and
the method further comprises preventing assignment of a second next source port for a predetermined period of time after assigning the first next source port.

18. The method of claim 10, wherein
congestion control information of two or more outbound packets sent from two or more ports of the plurality of ports meets the congestion control condition, and
the method further comprises determining a port of the two or more ports having a highest congestion value to be the congested port.

19. A computing system for use with packet-switched artificial intelligence training computer network, the computing system comprising:
a source computing device comprising a processor that executes instructions using portions of associated memory to implement:
a network traffic communication module configured to:
establish an artificial intelligence transport layer connection via an artificial intelligence transport layer protocol with a destination computing device,
identify a set of network paths to the destination computing device, each network path of the set of the network paths including at least one switch, and
provision a plurality of source ports to transmit outbound packets over the artificial intelligence transport layer connection to the destination computing device, the plurality of source ports being stored in a cyclic buffer, each source port of the plurality of source ports being associated with a respective network path of the set of network paths; and
a load balancing module that assigns each outbound packet on a per-packet basis to one of the plurality of source ports using a port scheduling algorithm that uniformly distributes the packets among the plurality of source ports, a field in a respective header of each outbound packing including a respective source port identifier, wherein
the at least one switch executes a hashing algorithm that uses the source port identifier of an incoming packet transmitted from the source computing device to generate a hash-based forwarding port number for the incoming packet,
upon receipt of the incoming packet, the destination computing device generates an acknowledgment notification including congestion information for the network path along which the incoming packet was transmitted and the source port identifier for the source port associated with the network path, and sends the acknowledgment notification to the source computing device,
when the congestion information indicates the associated-network path along which the incoming packet was transmitted is congested, the source port associated with the congested network path is not added to the cyclic buffer, such that each source port of the plurality of source ports stored in the cyclic buffer is associated with a respective known good network path at the time of its addition to the cyclic buffer, and
the load balancing module assigns a next source port from a remainder of the plurality of source ports stored in the cyclic buffer and not associated with the congested network path to ensure that outbound packets requiring retransmission are transmitted via an uncongested network path.

* * * * *